(12) United States Patent
Koenders et al.

(10) Patent No.: US 10,570,304 B2
(45) Date of Patent: Feb. 25, 2020

(54) BIOBASED MEMBRANE

(71) Applicant: Technische Universiteit Delft, Delft (NL)

(72) Inventors: Eduardus Aloysius Bernardus Koenders, Delft (NL); Jure Zlopasa, Delft (NL); Stephen James Picken, Delft (NL)

(73) Assignee: TECHNISCHE UNIVERSITEIT DELFT, Delft (NL)

( * ) Notice: Subject to any disclaimer, the term of this patent is extended or adjusted under 35 U.S.C. 154(b) by 578 days.

(21) Appl. No.: 15/082,965

(22) Filed: Mar. 28, 2016

(65) Prior Publication Data
US 2016/0251533 A1 Sep. 1, 2016

Related U.S. Application Data

(63) Continuation of application No. PCT/NL2014/050683, filed on Oct. 3, 2014.

(30) Foreign Application Priority Data

Oct. 3, 2013 (NL) ..................................... 2011542

(51) Int. Cl.
| | |
|---|---|
| *C08F 220/04* | (2006.01) |
| *C08F 220/06* | (2006.01) |
| *C08F 212/36* | (2006.01) |
| *C08K 3/34* | (2006.01) |
| *C09D 105/04* | (2006.01) |
| *C09D 5/00* | (2006.01) |
| *C09D 105/06* | (2006.01) |
| *C09D 105/00* | (2006.01) |
| *C09D 7/61* | (2018.01) |
| *C09D 7/40* | (2018.01) |
| *C04B 41/48* | (2006.01) |
| *C09D 5/08* | (2006.01) |
| *C09D 5/16* | (2006.01) |
| *C08K 3/36* | (2006.01) |
| *C04B 111/00* | (2006.01) |
| *C04B 111/24* | (2006.01) |
| *C04B 111/25* | (2006.01) |
| *C04B 111/74* | (2006.01) |

(52) U.S. Cl.
CPC ........ *C09D 105/04* (2013.01); *C04B 41/4803* (2013.01); *C09D 5/00* (2013.01); *C09D 5/08* (2013.01); *C09D 5/1656* (2013.01); *C09D 7/61* (2018.01); *C09D 7/70* (2018.01); *C09D 105/00* (2013.01); *C09D 105/06* (2013.01); *C04B 2111/00293* (2013.01); *C04B 2111/24* (2013.01); *C04B 2111/25* (2013.01); *C04B 2111/74* (2013.01); *C08K 3/34* (2013.01); *C08K 3/36* (2013.01)

(58) Field of Classification Search
CPC ........ C09D 105/04; C09D 5/00; C08K 3/346; C08K 3/34; C08F 220/08; C08F 212/36
See application file for complete search history.

(56) References Cited

U.S. PATENT DOCUMENTS

| | | | | |
|---|---|---|---|---|
| 2,850,396 | A * | 9/1958 | Fischer Karl | C09B 1/36 501/82 |
| 4,316,833 | A | 2/1982 | McGroarty | |
| 5,209,777 | A * | 5/1993 | Altwirth | A61K 6/0026 106/35 |
| 5,977,023 | A * | 11/1999 | Inoue | A01N 25/26 504/358 |
| 2002/0055558 | A1* | 5/2002 | Maehara | C09K 3/18 524/4 |

FOREIGN PATENT DOCUMENTS

| | | | | | |
|---|---|---|---|---|---|
| CN | 1566295 | A * | 1/2005 | .......... | C10M 173/00 |
| CN | 101502868 | | 8/2009 | | |
| CN | 101507915 | A * | 8/2009 | .............. | B01J 20/24 |
| CN | 101502868 | A * | 9/2009 | .............. | B22C 3/00 |
| CN | 101613693 | A * | 12/2009 | .............. | C12N 11/04 |
| CN | 102558599 | A * | 7/2012 | .............. | C08J 9/26 |
| CN | 102952792 | A * | 3/2013 | .............. | C12N 11/14 |
| CN | 103923329 | A * | 7/2014 | .............. | C08J 5/18 |
| CN | 106220125 | A * | 12/2016 | .............. | C04B 28/26 |
| JP | 49129719 | A * | 12/1974 | .............. | C04B 38/10 |
| JP | 06154800 | A * | 6/1994 | .............. | C02F 11/14 |
| JP | 07-112200 | A * | 5/1995 | .............. | C02F 11/14 |
| JP | 11131061 | A * | 5/1999 | .............. | C05G 3/04 |
| WO | 2015/050449 | | 4/2015 | | |

OTHER PUBLICATIONS

CN 1566295 A (Jan. 19, 2005) machine translation (Year: 2005).*
Kevadiya, B.D. et al. Journal of Biomaterials Applications, vol. 00-2009, p. 1-17. (Year: 2009).*

* cited by examiner

*Primary Examiner* — Rip A Lee
(74) *Attorney, Agent, or Firm* — Peacock Law P.C.; Janeen Vilven

(57) ABSTRACT

A composition for forming a bio-compatible membrane applicable to building material, such as concrete, cement, etc., to a method of applying said composition for forming a biocompatible membrane, a biocompatible membrane, use of said membrane for various purposes, and to building material comprising said membrane.

9 Claims, 1 Drawing Sheet

BIOBASED MEMBRANE

CROSS-REFERENCE TO RELATED APPLICATIONS

This application is a continuation of International Patent. Appicaton NL2014/050683, filed Oct. 3, 2014, in the name of "Technische Universiteit Delft", which PCT application claims priority to Netherlands Patent Application Serial No. 2011542, filed Oct. 3, 2013, in the name of "Technische Universiteit Delft", and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The present invention is in the field of a composition for forming a bio-compatible membrane applicable to building material, such as concrete, cement, etc., to a method of applying said composition for forming a bio-compatible membrane, a bio-compatible membrane, use of said membrane for various purposes, and to building material comprising said membrane.

Background of the Invention

Concrete is a composite construction material composed primarily of aggregate, cement and water, with mortar being similar thereto, however using finer aggregates. There are many formulations that have varied properties. The aggregate is generally a coarse gravel or crushed rocks such as limestone, or granite, along with a fine aggregate such as sand. The cement, commonly Portland cement, and other cementing materials such as fly ash, blast furnace slag cement, ground calcium carbonate, etc. serve as a part of binder for the aggregate. Typically further additives are present.

Various chemical admixtures can be added to achieve varied properties. Water is thereafter mixed with this dry or moist composite which enables it to be shaped (typically poured) and then solidified and hardened into rock-hard strength through a mineralogical transformation known as hydration and/or pozzolanic reaction. Also particle size and polarity of materials play a role in the performance of concrete. Concrete may be reinforced with materials that are strong in tension (often steel).

Admixtures are ingredients other than water, fine aggregates, (hydraulic) cement, and fibers that are added to the concrete batch immediately before or during mixing, in order to change certain characteristics of the concrete, when set.

For concrete production the various ingredients mentioned above are mixed. It is noted that concrete production is time-sensitive. Once the ingredients are mixed, the concrete must be put in place before it hardens, such as by casting. Then, quite critical as well, care must be taken to properly cure concrete, e.g. to achieve a required strength and hardness. It is noted that cement requires a moist, controlled environment to gain strength and harden fully. Such is often difficult to provide and to maintain. The cement paste hardens over a relatively long period of time, initially setting and becoming rigid though very weak and gaining in strength in the weeks following. It is noted that hydration and hardening of concrete initially, i.e. during the first three days, is considered critical. Abnormally fast drying and/or shrinkage are unwanted. It is considered of importance that concrete is kept sealed during the initial curing process. Such may be achieved by spraying or ponding the concrete surface with water, thereby protecting the concrete mass from harmful effects of ambient conditions. Additional common curing methods include wet burlap and/or plastic or paper sheeting covering the fresh concrete, or by spraying on a water-impermeable temporary curing membrane. In a prior art example a minimum thickness of e.g. 0.01 mm is required to ensure adequate strength in the (membrane) sheet (see e.g. ASTM C 171). Concrete should therein be covered with a membrane, either of plastic or of a chemical compound that will likely seal off the pores and retard the evaporation of water from concrete. After use such a sheet is typically removed. It is observed such a sheet does typically not fully cover concrete. A sheet may also be somewhat difficult to apply, especially when concrete is curved it is difficult to access, such as in high buildings and hidden areas, it may be of temporary nature, it can not be fully integrated with an underlying material, permeability may be difficult to adapt, toxic chemicals and solvents may be used, diffusion of membrane or constituents into concrete may take place, they may be sensitive with respect to time of application, typically they are non-degradable, and they may not be environmentally friendly.

In the context of the present invention a (semi)permeable membrane relates to a partially permeable membrane or a differentially permeable membrane. Such a membrane allows certain molecules or ions to pass through it by diffusion, such as gaseous species. It is noted that a rate of passage depends on various parameters, such as pressure difference, concentration difference, and temperature difference between circumstances on either side of a membrane, and permeability of the membrane to a given species, which permeability depends on solute or species size, solubility, chemistry, etc.

Once fully set, concrete may be prone to deterioration, such as by environmental influences. Therefore, after setting also protection from deterioration is preferred.

Incidentally various aqueous like compositions are known, comprising membrane forming constituents.

U.S. Pat. No. 4,316,833 (A) recites a liquid system containing no water to form an underground waterproof coating material containing a high concentration (70%+) of bentonite (sodium montmorilionite) which is non-hydrated, non-emulsifiable, unexpanded, non-jelled, non-thixotropic but is sufficiently liquid to be applied to a wood, metal or concrete substrate by a caulking gun, trowel or spray method. It can be used over a wide range of temperatures and can be applied to damp surfaces. The invention relates to a bentonite based composition for coating walls or sealing joints in concrete, and sealing around pipe openings and the like in building construction. The composition can be used for any type of waterproofing or water stop application if desired. Water cannot be used as or contained in the liquefier because it will destroy the properties of the system by hydrating the bentonite. The system may comprise beads, which beads may be coated with Ca-alginate. From the above it is clear that the system has no capability to form a membrane; it is solely intended to swell. Application is therefore inside cracks and the like, in order to seal.

CN101502868 (A) recites a centrifugal casting radiant tube coating and a preparation method thereof, the coating comprises the ingredients (mass percent) of: amongst others 25-30% of diatomite of, 5-10% of zircon powder, 4.5-5.0% of sodium bentonite, 2.0-2.5% of polyvinyl alcohol, 0.8-1.0% of sodium alginate, 3.5-4.0% of silica sol, and 46.82-49.95% of water, wherein, the mass percent of the diatomite and the zircon powder is not less than 35% and not more than 37%, the mass percent of titanium powder and iron powder is not less than 2.7% and not more than 2.9%, and the mass percent of the sodium bentonite plus the polyvinyl alcohol plus the sodium alginate is not less than 8.0% and not more than 8.2%. The coating is used for the centrifugal casting radiant tube after dry-blending, mixed grinding and sieving, uniformly distributed bulges (namely pitting surface) can be formed on the outer surface of the radiant tube to improve heat efficiency of the radiant tube. The coating also has excellent adhesive force, high temperature strength and crack resistance, thus reducing defects on the surface of the radiant tube and improving quality of complex tube.

The above two documents do not relate to an aqueous bio-compatible solution that can be applied on a surface.

Thus there is a need for improved membranes.

The present invention relates to a composition for forming such a membrane, use thereof, and material comprising said membrane, which overcomes one or more of the above disadvantages, without jeopardizing functionality and advantages.

BRIEF SUMMARY OF THE INVENTION

The present invention relates to an aqueous composition for forming a bio-compatible membrane according to claim 11, a method for forming a bio-compatible flexible membrane according to claim 1, a method of protecting a surface from degradation according to claim 6, a coating according to claim 7 or 8, a material comprising said coating according to claim 10, and use of the present composition and/or present polymer coating according to claim 15.

The invention makes use of non-toxic and environmentally friendly components. These components are biocompatible, i.e. an impact on the biological environment is considered minimal. The composition has as a main liquid water, or may be formed primarily from water.

The polymer used is preferably bio degradable, that can be degraded by e.g. bacteria, yet is stable enough to provide e.g. a good protection for an underlying material, such as concrete. The polymer dissolves sufficiently in water, typically forming a viscous solution. As such anionic polymers, for example in alkaline form, and acidic polymers are considered specifically. The polymer is capable of forming a gel, once being in contact with polyvalent cations, thereby forming a flexible, impermeable membrane. The membrane preserves water being present in an underlying material and protects the underlying material from the environment. Certain types of polymers used may form a recoverable coating or membrane, such as when both an alginate and alginate producing microorganisms are present.

Instead of the present polymer, or in addition thereto, a (water soluble) silicate material may be present. The silicate is considered biocompatible as well. The silicate forms a glassy structure upon contact with a polyvalent cation. The silicate may be an in water dissolvable cyclic and single chain silicate ($SiO_{2+n}^{2-}$), a pyrosilicate ($Si_2O_7^{6-}$), a branched silicate, and a component that forms a silicate.

The silicate and/or polymer provide a conformal coating to a surface to which it is applied. The coating acts e.g. as protection against chemicals, moisture, dust, and temperature extremes that, if uncoated (non-protected), could result in damage or failure of an underlying surface/material, and also maintains conditions of the surface, such as humidity or moisture content. The silicate provides a more stiff coating, the polymer a more flexible coating, and a combination of silicate and polymer may have in between characteristics.

The present composition does not or at the most to a small extent penetrate into a surface to which it is applied. The membrane or coating formed can not be washed away by water, such as by rain. The membrane is fully integrated with an underlying surface, adheres thereto, and may be considered as a layer having suitable characteristics. So surprisingly the present composition may be applied directly to a surface and provides advantageous effects.

It has been found that in order to have improved barrier properties further platelet nanoparticles are preferably present. Platelet nanoparticles have dimensions wherein a length, and likewise a width, thereof is significantly larger than a height thereof, such as at least a factor 5 larger. A height of the nanoparticles is typically in the order of a crystallographic axis thereof, or a few times the axis, such as 1-50 nm or more. The width and length of the nanoparticles are from 10 nm-5 µm, preferably from 25 nm-1 µm, more preferably from 50 nm-500 nm, such as from 100 nm-250 nm.

The nanoparticles are typically suspended in the aqueous composition. Once a gel and/or glassy structure is formed it has been found that the nanoparticles are incorporated therein.

The present composition may comprise 0.5-80 wt. % solids, and water, preferably 1-50 wt. % solids, more preferably 1.5-30 wt. % solids, even more preferably 2-20 wt. % solids, such as 5-10 wt. % solids (based on a total weight of the composition). The solids relate to biopolymer and/or silicate, and nanoparticles, and optionally to further additives.

The amount of bio-degradable polymer and/or a synthetic acid polymer is (each individually) 1.5-80 wt. % (based on the total weight of the solids), preferably 2-40 wt. %, more preferably 3-30 wt. %, such as 5-20 wt. %. The amount of one or more of an in water dissolvable silicates is 0.01-25 wt. % (based on the total weight of the solids), preferably 0.1-20 wt. %, more preferably 0.5-10 wt. %, such as 1-5 wt. %. If present the amount of nanoparticles is 0.01-80 wt. % (based on the total weight of the solids), preferably 0.1-70 wt. %, more preferably 1-60 wt 0.1, such as 5-50 wt. %. In other words the nanoparticles may form an abundant fraction of the solids, a very small fraction, or something in between.

If present further additives form a small fraction of the solids, such as less than 5 wt. % thereof, typically less than 2 wt. %.

In a further aspect the present invention relates to a solid composition, comprising 1.5-50 wt. % bio-degradable polymer and/or a synthetic acid polymer, and/or 0.1-20 wt. % dissolvable silicate, 0.01-80 wt. % nanoparticles, and less than 2 wt. % further additives.

In an example in the solids the biopolymer is alginate, preferably ALE, the nanoparticles are clay, preferably montmorillonite, and the silicate is a monovalent silicate, such as $Na_2SiO_3$.

It is an important characteristic of the present composition that once applied onto a surface, the surface providing polyvalent cations, a membrane is formed immediately, i.e. within a short time frame. As such properties of a surface are not changed significantly, e.g. by penetration of the composition or components thereof into the surface.

Once applied to a surface the present composition provides its beneficial effects thereto, without deterioration of the surface or optional underlying material. For instance in the case of cement casting, setting thereof is controlled with the present membrane, typically without a need to provide (further) water, to control temperature, etc. As such the process of setting can now be carried out without making use of huge amounts of (relatively) scarce resources, such as water, by providing a relatively cheap (amount of) composition forming a membrane. Therewith disadvantages of the prior art are overcome.

A very important benefit of the present membrane is that it avoids drying of the concrete surface which drying, on its turn, might cause surface cracking. So (too much) drying of concrete involves cracking thereof. By providing the present membrane cracking is avoided. Apart from the reduction of permeability, prevention of cracking is a very important motivator to use the present membranes, also because it improves visual appearance of the concrete.

Thereby the present invention provides a solution to one or more of the above mentioned problems. Advantages of the present invention are detailed throughout the description.

DETAILED DESCRIPTION OF THE INVENTION

The present invention relates in a second aspect to a composition according to claim 11.

In an example of the present composition an amount (wt. %) of polymer and/or silicate is larger than an amount of nanoparticle. Ratios between amount of (ii) polymer and/or silicate and amount of nanoparticle that provide advantageous characteristics to a membrane or coating formed, e.g. in terms of (im)permeability towards water, have been found to be in a range of (ii):(iii)=2:1 to (ii):(iii)=1000:1 (that is in almost equal amounts co an abundant polymer/silicate). It is preferred to use an amount of (ii):(iii)=5:1 to (ii):(iii)=100:1, such as (ii):(iii)=10:1 to (ii):(iii)=50:1. The ratio may vary somewhat on type of polymer/silicate used on the one hand, and on type of nanoparticles used on the other hand.

In an example of the present composition wherein, the bio-degradable polymer and/or the synthetic acid polymer are/is present in an amount of 1.5-64 wt. %, preferably 2-20 wt. %, more preferably 3-5 wt. %, and/or the one or more silicate are/is present in an amount of 0.01-18 wt. %, preferably 0.1-5 wt. %, more preferably 0.5-2.5 wt. %, based on a total weight of the composition. The amount of polymer/silicate may be adjusted to e.g. ambient conditions, such as temperature, humidity, and to a surface to which the present composition may be applied, etc. If a flexible coating or membrane is required, an amount of polymer is higher, whereas if a stiff coating is required an amount of silicate may be higher. Depending on a type of polymer/silicate an amount may be higher, e.g. if a gel is somewhat difficult to form at low amounts thereof. If it is preferred to have a relative permeable coating a somewhat lower amount is preferred. The amount is preferably 2-30 wt. %, more preferably 5-20 wt. %, such as 10-15 wt. %. In general, these amounts provide the best characteristics. Also in view of applicability and viscosity the amounts may be varied.

In an example of the present composition wherein the polymer is one or more of an anionic polysaccharide, such as alginate, poly vinyl alcohol, poly (meth)acryl amide, acidic polymer, poly styrene sulphonate, poly (meth)acrylic acid, acidic biopolymers, pectin, carrageenan, gelatin, a synthetic acid polymer, wherein the polymer may comprise one or more of a phosphate, sulphate and carboxylic group, and proteins. Polysaccharides may be defined as having a general formula of $C_x(H_2O)_y$, wherein x is a large number between e.g. 50 and 10000. Considering that the repeating units in the polymer backbone are often six-carbon monosaccharides, the general formula can also be represented as $(C_5H_{10}O_5)$, wherein as an example $10 \leq n \leq 3000$. In other words relatively small to relatively large molecules are considered. As such the present invention is in principle applicable with a relative wide range of anionic bio-degradable polymers. The type of polymer may be selected and adapted to specific requirements and boundary conditions. Some polymers relate to products obtainable from waste, such as sludge, for instance waste alginate. From an economical point of view the(se) latter may be preferred.

In an example of the present composition the polyvalent cation is one or more of calcium, iron, copper, magnesium, strontium, aluminium, zinc, magnesium, and nickel, especially a De and $M^{3+}$ cation are preferred. In view of the environment the cation is preferably non-toxic, such as calcium, iron, and magnesium, preferably calcium or iron. The present invention can as a consequence in this respect be applied widely.

In an example of the present composition (iii) the nanoparticles are one or more of a natural or artificial clay, the clay preferably a monovalent cation clay. The clay preferably has a cationic exchange capacity of 2-200 meq/100 grams clay at a pH of 7, more preferably 5-150 meg/100 grams, even more preferably 10-120 meg/100 grams. It has been found that clays having a relatively higher CEO perform better in terms of relevant characteristics for the present invention. The clay may comprise one or more of $H^+$, $Na^+$, $K^+$, $Li^+$, and $NH_4^+$. The clay may be a tetrahedral-octahedral-tetrahedral (TOT)-clay (or 2:1 clay), such as a kaolin clay, such as kaolinite, dickite, halloysite and nacrite, a smectite clay, such as bentonite, montmorillonite, nontronite and saponite, an illite clay, a chlorite clay. Also a silicate mineral, such as mica, such as biotite, lepidolite, muscovite, phlogopite, zinnwaidite, clintonite, and allophane, are applicable as well as platelet like particles. A clay applied may further be selected in view of required characteristics of a final coating. Addition of nanoparticles may improve present characteristics, e.g. (decreased) permeability towards water, structural integrity, strength, flexibility, etc.

In an example of the present composition the nanoparticles are present in an amount of 0.01-64 wt. %, preferably 0.1-50 wt. %, more preferably 0.5-30 wt. %, even more preferably 1-20 wt. %, such as 2-10 wt 0.1 or 3-5 wt. %, based on a total weight, of the composition. It is noted that relatively low amounts of nanoparticles may be used, which low amounts may still provide improved characteristics of the present invention. Higher amounts may be preferred, e.g. in view of (decreased) permeability, stiffness, integrity, etc.

In an example of the present composition may comprise further additives, such as an anti-fouling additive. An example thereof is $CuSO_4$. Additives may be added directly to the composition, if compatible, or may be added after applying the composition. Further additives, such as UV-blocker, stabilizers, fillers, colorants, and pigments may be added.

In a first aspect the present invention relates to a method of forming a bio-compatible membrane according to claim 1. Therein the present composition may be used, and similarly a first composition comprising the present polymer/silicate and a second composition comprising the present nanoparticles, if present, may be used. The two compositions may be applied separately to a surface, and then mixing of the compositions may take place. As mixing may be less optimal in view of present characteristic of a coating being formed, application of one composition is typically preferred. The present surface, e.g. concrete, provides polyvalent cations, such as $Ca^{2+}$. It has been found that a good coating is obtained by applying the present composition. Surprisingly a (semi) solid surface like that of concrete is capable of providing polyvalent cations in sufficient amounts to form a membrane/coating according to the invention, and wherein the composition does not (or slightly at the most) penetrate the surface. Even further, without further measures the present method is capable of forming a membrane with required characteristics.

The present method may be repeated, e.g. if a thicker coating is required, it characteristics of the subsequent coating may or should vary, etc.

In an example of the present method the surface is pre-treated and/or pre-shaped. As such a surface can be given any (2- or 3-dimensional) shape. Inc present coating applied to the surface inherently has a same or at least similar) shape. If proper care is taken the present coating has exactly the same shape as the surface. As such a surface may be used as a two- or three-dimensional mold. Very cheap reproductions may be made, having a very high quality.

In an example of the present method the surface is one or more of concrete, cement material, and brick. These types of materials are widely used and formed and the present coating/membrane may provide advantageous characteristics to these materials.

In an example of the present method the polymer is Na-alginate, preferably a non-food grade alginate, such as obtained from a waste material handling system, such as a sludge. The alginate may be obtained from bacteria, especially from granules. The alginate from sludge is very cheap, provides better characteristics than alginate from algae, such as improved hydrophobicity and hydrophilicity (ambivalent), can not be used in food or the like, and is therefore considered a very good material for the present invention.

An example of the present biopolymer relates to so-called extracellular substances obtainable from granular sludge.

In an example, the extracellular polymeric substances comprise a major portion consisting of exopolysaccharides, and a minor portion, such as less than 30% w/w, typically less than 10% w/w, consisting of lipids and/or other components more hydrophobic than the exopolysaccharides.

The weight percentages (w/w) throughout the description are based on a total weight of a (dry) composition.

Extracellular polymeric substances obtained from granular sludge having a major portion of exopolysaccharides and a minor portion of lipids have been found to provide very effective water resistance.

In an example, the extracellular polymeric substances comprise at least 50% w/w exopolysaccharides, preferably at least 60% w/w exopolysaccharides, most preferably at least 75% w/w exopolysaccharides, such as at least 90% w/w exopolysaccharides. Extracellular polymeric substances obtained from granular sludge have been found to be particularly effective when they have a high exopolysaccharide content. The exopolysaccharide content is preferably not 100%, as the remainder has been found to contribute to the present advantageous effects.

In an example, the granular sludge is aerobic granular sludge or anammox granular sludge. Extracellular polymeric substances obtained from aerobic granular sludge and anammox granular sludge have been shown to be particularly effective. Research by the inventors has shown that exopolysaccharides of the extracellular polymeric substances obtained from aerobic granular sludge are alginate-like in character, and in fact perform even better than alginate per se.

Aerobic granular sludge and anammox granular sludge, and the processes used for obtaining them are known to a person skilled in the art. For the uninitiated, reference is made to Water Research, 2007, doi:10.1016/j.watres.2007.03.044 (anammox granular sludge) and Water Science and Technology, 2007, 55 (8-9), 75-81 (aerobic granular sludge).

In an example, the extracellular polymeric substances (EPS) have been obtained from aerobic or anammox granular sludge by an isolation (i.e. separation) method comprising: alkaline extraction of the granular sludge thereby forming extracellular polymeric substances containing extractant; acid precipitation of extracellular polymeric substances from the extractant; and collecting the extracellular polymeric substance-containing precipitate.

It has been found that this method is particularly effective for obtaining extracellular polymeric substances from granular sludge, such as from aerobic and anammox granular sludge, in good yield.

In an example, the granular sludge has been substantially produced by bacteria belonging to the order Pseudomonadaceae, such as *pseudomonas* and/or *Azotobacter* bacteria (aerobic granular sludge); or, by bacteria belonging to the order Plancto-mycetales (anammox granular sludge), such as *Brocadia anammoxidans, Kuenenia stuttaartiensis* or *Brocadia fulgida*; or, combinations thereof. Extracellular polymeric substances from granular sludge produced by these bacteria are effective.

In an example, the exopolysaccharides are block-copolymers comprising uronic acid (e.g. mannuronic acid and quluronic acid) residues.

In an example of the present method the clay is Na-montmorillonite.

In an example of the present method the composition is applied in an amount of 10-1000 ml/m$^2$, such as 10-500 ml/m$^2$. Surprisingly a relatively thin coating is sufficient to provide the present advantages. A coating of 1-10 μm thickness is typically sufficient. Also a sequence of coating layers may be applied. In comparison with the present invention, if a surface would be kept wet with water 1-30 l/m$^2$ would be required, i.e. at least an order of magnitude larger. Especially when (fresh) water is scarce and/or temperatures are high such may be an issue.

In an example of the present method the composition is applied at least once by one or more of spraying, brushing, nebulizing, and pouring. The present method is relatively insensitive to a way application is performed. For some surfaces, especially ones less accessible, spraying/nebulizing is preferred.

In an example of the present method the composition is applied directly after casting cement or concrete.

In a third aspect the present invention relates to a method of protecting a surface from degradation according to claim 6. As indicated throughout the application especially these materials are considered.

In an example the surface is protected from one or more of drying, oxidizing, such as corroding, wearing, fouling, and dehydrating.

In a fourth aspect the present invention relates to a coating according to claim 7 or 8.

In an example the coating is stiff, comprising polyvalent cations, water, optionally platelet nanoparticles, and one or more of an in water dissolvable silicate, such as a cyclic and single chain silicate. The coating can e.g. be used to reproduce objects using a surface, such as that of concrete, as a mold. The concrete surface is pre-shaped into a desired form. The form may be two- or three-dimensional. By using the present method relatively complex shapes, such as optical components, such as mirrors, or parts thereof, can be formed without much trouble.

In an example the coating is flexible. It is noted that combinations of polymers may be used, as well as combinations of nanoparticles, in order to obtain required characteristics.

In an example the present coating is applied in an environment comprising algae. The algae may provide alginate for maintaining properties or even (self) recoverable of the present coating. For instance, if concrete is applied in salty aqueous conditions, such as in a sea or ocean, a coating applied will remain effective, e.g. in terms of protection. It has been found that the present membranes improve a life time of underwater concrete, and reduce maintenance costs thereof.

In a fifth aspect the present invention relates to one or more of concrete, cement material, and brick, comprising a water impermeable flexible polymer coating according to the invention.

In an example the coating has a thickness of 5-500 μm, more preferably a thickness of 10-250 μm, such as a thickness of 50-100 μm. In view of the amounts of water and components a relatively thicker coating (e.g. 100 μm) would still require a low amount of composition (0.1 l/m²), i.e. is practically not very limiting.

In a sixth aspect the present invention relates to a use of the present composition and/or of the present flexible polymer coating for one or more of improving setting of concrete, protecting concrete or cement material from degradation.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

DETAILED DESCRIPTION OF FIGURES

Figure 1:
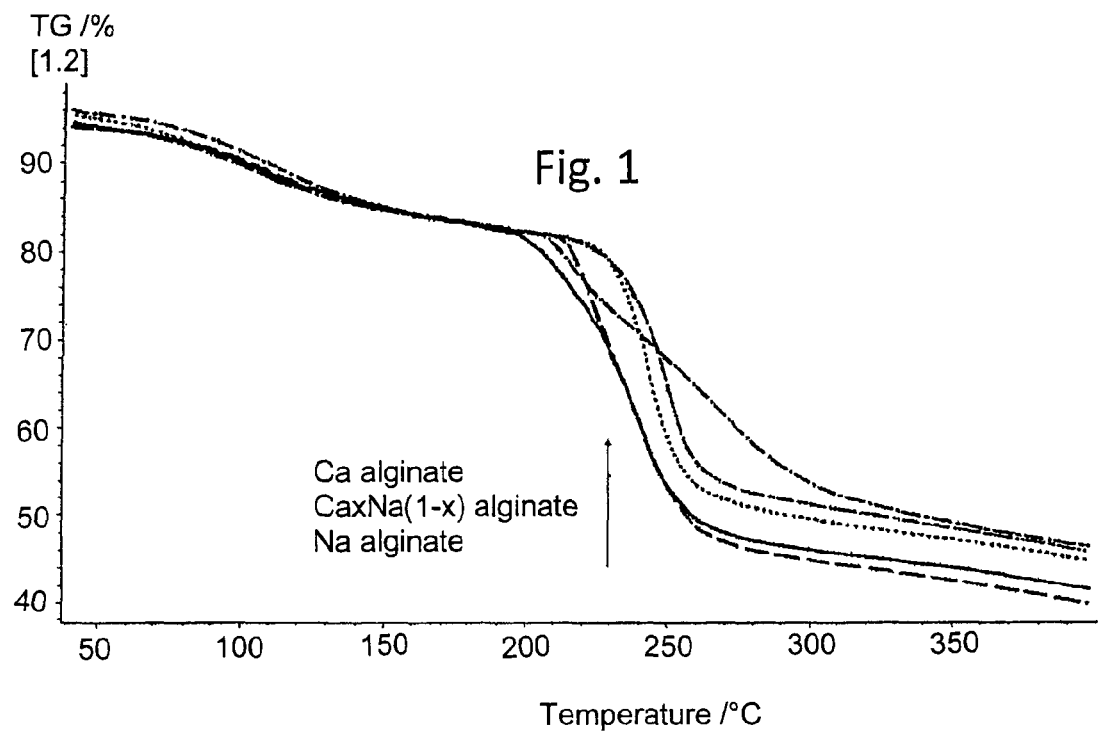
FIG. 1. Thermogravimetric curves of samples with different calcium content alginates.

The figures are further detailed in the description of the experiments below.

Examples/Experiments

The invention although described in detailed explanatory context may be best understood in conjunction with the accompanying examples and figures.

The present invention has led to various scientific publications and presentations further supporting the present application. Specifically worthwhile mentioning are the presentation "Highly ordered biopolymer clay nanocomposites" by J. Zlopasa et al, on the Dutch Polymer Days, Mar. 17-18 2014, "A novel biobased curing compound for cement-based", by J. Zlopasa et al., Proceedings of International Conference APPLICATION OF SUPER ABSORBENT POLYMERS AND OTHER NEW ADMIXTURES IN CONCRETE CONSTRUCTION, Dresden 14-17 Sep. 2014, Germany, and "Using biobased polymers for curing cement-based materials" by J. Zlopasa. et. al., Proceedings of the Intern. Conference on Ageing of Materials & Structures, Delft 26-28 May 2014, The Netherlands. These presentations and their contents are incorporated by reference into the present application.

In a first experiment various combinations of polymer, nanoparticle, silicate, respectively, and clay were tested. The experiment consisted of pouring solutions of cement surface. All but one mentioned exhibited rapid pal formation when they got into contact with cement surface, the surface providing $Ca^{2+}$ ions. The results are summarized in the table I below.

TABLE 1

| Sample | Na Alginate | Na MMT | $Na_2SiO_3$ | Result |
|--------|-------------|--------|-------------|--------|
| 1 | + | − | − | + |
| 2 | + | + | − | + |
| 3 | + | + | + | + |
| 4 | + | − | + | + |
| 5 | − | + | − | 0 |
| 6 | − | + | + | 0 |
| 7 | − | − | + | 0 |

The alginate relates to a bacterial alginate, obtained from sludge. MMT relates to montmorillonite. Therein a "+" indicates rapid formation of a gel, the gel having characteristics in line with the description above. "0" indicates forming of a gi but questionable if the gel has all the characteristics mentioned. For example the gels of samples 5-7 cracked upon drying. "-" indicates no gel being formed.

The concentrations of Na-alginate in samples 1, 2, 3 and 4 is 2 wt. %, and concentrations of NaMMT and $Na_2SiO$ is about 5 wt. % with respect to the weight of Na alginate: in total composition that relates to 2 wt. % of Na Alginate and 0.107 wt. % of $Na_2SiO_3$ and/or 0.107 wt. % of NaMMT. The concentration for samples 5 and 7 was 2 wt. %, for NaMMT and $Na_2NaSiO_3$, respectively. And for sample 6, the concentration was 2 wt. % of $Na_2SiO_3$ and about 5 wt. % of NaMMT on the weight of $Na_2SiO_3$; in total composition that relates to 2 wt. % of $Na_2SiO_3$ and 0.107 wt. % of NaMMT.

Mechanical Testing

The measurements for the mechanical test were performed using Dynamic mechanical analysis. The results are presented in terms of storage modulus, which is considered to be similar to (the values of the Youngs modulus, due to the elastic response. For the modulus a value of 4.16 GPa was found. Typical values found are 2-10 GPa.

The water-vapor transmission was determined gravimetrically by a water-vapor permeability test, which was performed using a cup method, according to ASTM E96. The water vapor permeability was found to be $1.8*10^{-10}$ g/smPa. Typical values found are $1-10*10^{-10}$ g/smPa.

FIG. 1 presents the mass loss of alginates with different degrees of Ca-cross-linking, obtained by thermogravimetric analysis. The thermogravity (in %) is plotted against the temperature (in ° C.). The samples were analyzed under 10 K/min heat rate and the mass loss was monitored. Decomposition of Na-alginate and Ca-alginate result in formation of $Na_2CO_3$ and $CaCO_3$, respectively. With this method inventors were able to characterize a degree of crosslinking of calcium in biobased membranes. The mass loss of samples corresponds to an amount of calcium added to the sodium alginate. FIG. 1 provides data determined on standard solutions, in order to obtain curves, which curves are used to recalculate results of experimental data in terms of amounts of alginate being present. It is observed that the present composition provides good barrier properties.

TABLE 2

Mass losses of different degree of crosslinking from FIG. 1.

| mass loss % | Degree of crosslinking |
|---|---|
| 23.35 | 1 |
| 26.48 | 0.67 |
| 28.29 | 0.48 |
| 30.9 | 0.2 |
| 32.76 | 0 |

Figure 2A:
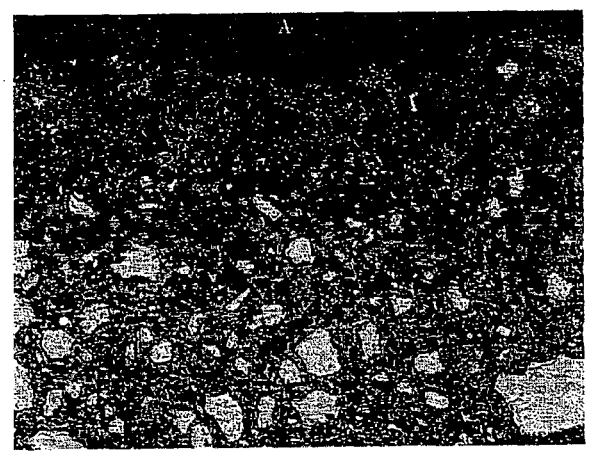
FIG. 2a. ESEM/BSE micrographs comparing near surface area of cement cured with a layer of water and FIG. 2b. sodium alginate.
Figure 2B:
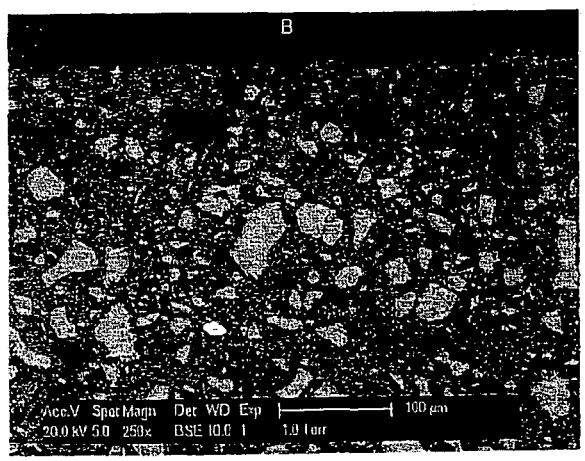

Results from examining a near surface area of cement after 28 days of hydration are shown in FIGS. 2a and 2b. The volume of the liquids (water (FIG. 2a) and 2 wt. % Na-alginate solution (FIG. 2b), respectively) applied on the 24 $cm^2$ surface of cement was 10 ml. The samples were stored at 50% RH and 20° C. In the water cured sample (FIG. 2a), most of the water evaporated in 4 days' time, while in the case of alginate solution sample a gel surface maintained for 7 days, after which a dried alginate film was formed.

From the ESEM/BSE images (FIGS. 2a and 2h), inventors observe the developed microstructures of cement paste, from which inventors conclude that a more porous microstructure is developed when the cement is cured with water, evidenced by more open structures in FIG. 2a, which is considered a disadvantage. This observation corroborates with the measurements of mass loss of the cement samples over 28 days, from which inventors observed a reduced mass loss of cement paste covered with Na-alginate solution compared to water applied on the surface of cement. It should also be noted that water and Na-alginate both leach some calcium from cement, in order to form $CaCO_3$ and Ca-alginate, respectively. By examining the micrographs, it appears that the presence of Na-alginate lowers the leaching of calcium, which also contributes to a denser microstructure.

Inventors mixed 0.45 w/c cement paste, and distributed equally in four trays, one control tray without a coating, and three were covered with Na Alginate, Na Alginate/5 w. % MMT and Na Alginate/20 wt. % MMT, respectively. The time of application of the coatings was a few minutes after the cement paste was mixed and poured. The Graffiti paint was applied after: 1 h, 3 h, 4 h, 20 h, 24 h, 27 h and 45 h, respectively.

After 50 h inventors removed the coating and there was no graffiti on the cement. In other words the present coating is a good anti-graffiti coating.

Methods

Aerobic Granular Sludge for Investigation

The aerobic granular sludge from which the extracellular polymeric substances of the present example were obtained was collected from the Nereda® pilot plant, operated by DHV at the wastewater treatment plant Epe, The Netherlands. The reactor was fed with municipal sewage. The influent consisted of approximately 25% of slaughterhouse wastewater, which was discharged in the sewage system. Average parameters of the influent were: CODtotal 585 mg/L, suspended solids 195 mg/L, $NH_4$—N 55 mg/L and PO4-P 6.3 mg/L. The reactor was operated in Sequencing Batch (SBR) mode for biological phosphate and nitrogen removal. Operational details were described in Lin et al. (2010). After start-up, biomass concentration in the reactor was maintained around 8 to 10 g TSS/L. Oxygen in the reactor was controlled between 2 to 3 mg/L during aeration. Temperature and pH were not controlled in this system and depended on the incoming sewage. During steady operation, aerobic granular sludge was collected and sieved to give granules with a diameter >2 mm.

The granules were then dried.

Isolation of Extracellular Polymeric Substances

Dried granules (0.5 g) were homogenized for 5 min (Labgen tissue homogenizer, Cole-Parmer, USA) and extracted in 80 ml 0.2 M $Na_2CO_3$ at 80° C. for 1 h. After centrifuging at 15,000 rpm for 20 min, the pellet was discarded. The supernatant pH was adjusted to 2 by adding 0.1 M HCl. The precipitate was collected by centrifugation (15,000 rpm, 30 min), washed by di-deionized water until effluent pH reached 7, and dissolved in 0.1 M NaOH. Extracellular polymeric substances in the supernatant were precipitated by the addition of cold absolute ethanol to a final concentration of 80% (vol/vol). The precipitate was collected by centrifugation (15,000 rpm, 30 min), washed three times in absolute ethanol and lyophilized. The resulting mixture of extracellular polymer substances is an example of extracellular polymeric substances (EPS) obtainable from granular sludge according to the invention.

Ash content of the EPS was measured according to the standard method (APHA).

Characterization of EPS

Before characterization, EPS (0.5 g) was dissolved in 15 mL of NaOH solution (0.05 M). The pH was then adjusted to 7.0 by 0.05 M HCl. Finally the solution was placed inside a dialysis tubing (3500 MWCO) and dialyzed against demineralized water for 48 hours to remove loosely bound ions and lyophilized.

Morphology of EPS by Atomic Force Microscopy

Imaging of EPS was carried out in air at ambient temperature and humidity using freshly-cleaved mica pre-treated by 3 mM $NiCl_3$. Aliquots (2 ul) of extracellular polymeric sub-stances (5 mg/L) were deposited onto mica surfaces for 10 s, and then quickly removed by the pipette. Those surfaces were air dried (1 h) in a dust-free enclosure. Samples were scanned with a Digital Instruments Multimode atomic force microscope (Veeco nanoscopy iva dimension 3100, Veeco Inc., Santa Barbara, USA).

EPS Composition Analysis by Pyrolysis-Gas Chromatography-Mass Spectrometry

Pyrolysis was carried out on a Horizon Instruments Curie-Point pyrolyser. The lyophilized extracellular polymeric sub-stances were heated for 5 s at 600° C. The pyrolysis unit was connected to a Carlo Erba GC8060 as chromatograph and the products were separated by a fused silica column (Varian, 25 m, 0.25 mm i.d.) coated with CP-Sil5 (film thickness 0.40 µm). Helium was used as carrier gas. The oven was initially kept at 40° C. for 1 min, next it was heated at a rate of 7° C./min. to 320° C. and maintained at that temperature for 15 min. The column was coupled to a Fisons MD800 mass spectrometer (mass range m/z 45-650, ionization energy 70 eV, cycle time 0.7 s). Identification of the compounds was carried out by their mass spectra using a NIST library or by interpretation of the spectra, by their retention times and/or by comparison with literature data.

Lipid Content of EPS

For lipids analysis in the extracellular polymeric substances, the methods proposed by Smolders et al. (1994) were used with modification. Pure fatty acids (Sigma-Aldrich) were used as external standard. Freeze-dried extracellular polymeric substance samples and fatty acid standards were weighed using an analytical balance and transferred into tubes with screw caps. One milligramme of C15 fatty acid in 1-propanol was used as internal standard. 1.5 mL of a mixture of concentrated. HCl and 1-propanol (1:4), and 1.5 mL of dichloroethane were added into the tubes and heated for 2 h at 100° C. After cooling, free acids were extracted from the organic phase with 3 mL water. One milliliter of the organic phase was filtered over water-free sodium sulphate into GC vials. The lipids in the organic phase were analyzed by gas chromatography (model 6890N, Agilent, USA) equipped with a FID, on an HP Innowax column.

EPS Molecular Weight Analysis

Size exclusion chromatography was performed with a Superdex 75 10/300 GL column (AKTA Purifier System, GE Healthcare). Elution was carried out at roach temperature using PBS at constant 0.4 mL/min flow rate and detection was monitored by following the absorbance of the eluted molecules at 210 nm.

Superdex 75 10/300 GL (GE Healthcare) column separates molecules of 1 000 to 150 000 Daltons (Da) with a total exclusion volume of 7.9 mL. Measurement of the elution volume of dextran standards (1000 Da, 5000 Da, 12000 Da, 25 000 Da and 50 000 Da) led to the calibration equation:

$$Log(MW) = 6.212 - 0.1861 \, Ve$$

MW: Molecular Weight of the molecule in Dalton (Da)

Ve: elution volume in mL (assayed at the top of the peak)

Chromatogram profiles were recorded with UNICORN 5.1 software (GE Healthcare). Peak retention times and peak areas were directly calculated and delivered by the program.

Bleaching of EPS

EPS (1 g) was put into $H_2O_2$ (30%) for 24 hours, collected by centrifuge at 4000 rpm and lyophilized.

Morphology of Extracellular Polymeric Substances by the Atomic Force Microscope

The yield of extracellular polymeric substances was 160±4 mg/g (VSS ratio).

The extracellular polymeric substances have a fiber-like structure. The width of the fiber is around 20 nm. The fibers extend along the surface and entangle with each other, forming a web-like structure that covers the whole surface of the mica. This demonstrates that the extracellular polymeric substances have a perfect film-forming property and can form a continuous film on a surface. The thickness of extracellular polymeric sub-stance film is around 4 nm. In addition to the fibers, there are a few globules distributing on the fibers and pointing to the air. The height of the globules can reach 15 nm, which is 2 times higher than the thickness of extracellular polymeric substance film. Due to the significant difference in height, the globules looked much brighter than the fibers under the atomic force microscope. As the sample was prepared by depositing extracellular polymeric substance water solution on a surface and air dried, those globules extending out of the surface and pointing to the air must have hydrophobic property.

Therefore, the extracellular polymeric substances have both a hydrophilic part and hydrophobic part. When the extracellular polymeric substances stay at the surface between water and air, the hydrophilic parts spread along the surface, forming a film and the hydrophobic parts distribute on the film and pointing to the air.

Extracellular Polymeric Substance Composition Analysis

The composition of the extracellular polymeric substances was analyzed by pyrolysis-GC-MS. In the spectrum (FIG. 4), polysaccharide-derived products such as 5-methylfuraldhyde and levoglucosenone were identified, implying a contribution from carbohydrate units to the extracellular polymeric substance sample. Lipids and wax esters composed of $C_{16}$ and $C_{18}$ fatty acids and alcohol moieties of the same carbon lengths were found as well. By contrast, all pyrolysis products of proteins and other combinations of amino acids were much less prominent, indicating that they were relatively minor components of the extracellular polymeric substances. In addition, there is a so-called unresolved complex mixture consisting of ma similar compounds that co-elute and which cannot be identified by their mass spectra at present. In brief, the pyrolysis-GC-MS analysis displays that, comparing to carbohydrates and lipids, proteins are a minor part of the extracellular polymeric substances.

The lipid content in the extracellular polymeric substances was measured as 8.2±0.9 mg/g extracellular polymeric substances.

Since normally polysaccharides are hydrophilic and lipids are hydrophobic, it can be assumed that the fiber-like structure which forms film on the surface are mostly polysaccharides and those globules pointing towards the air are mostly lipids.

Molecular Weight of Extracellular Polymeric Substances

The size distribution profile of the extracellular polymeric substances by size exclusion chromatography is determined. There are 5 fractions with different elution vol-ume. The fraction with the shortest elution volume, which has the highest molecular weight, separate well with other fractions. The three fractions with an elution volume between 13 ml to 17 ml co-eluted. The molecular weight of these 5 fractions and their percentages are listed in Table 3. It can be clearly seen that most of isolated extracellular polymeric, substances (94%) has a molecular weight of more than 5.8 KDa, and about ⅓ of the extracellular polymeric substances has a molecular weight higher than 150 KDa. As carbohydrates with higher molecular weight tend to extend on the surface, it could be an explanation for the perfect film-forming property of the isolated extracellular polymeric sub-stances.

TABLE 3

Molecular weight of different fractions in extra-cellular polymeric substances isolated from granular sludge and their percentage.

| Elution volume of the peak (ml) | Molecular weight (Da) | Percentage of the fraction (% peak area) |
|---|---|---|
| 7.83 | $7 \times 10^4$ | 29.74 |
| 13.48 | $1.44 \times 10^4$ | 18.82 |
| 15.57 | $5.79 \times 10^3$ | 45.15 |
| 17.58 | $2.15 \times 10^3$ | 4.42 |
| 20.13 | $6.56 \times 10^2$ | 1.87 |

It should be appreciated that for commercial application it may be preferable to use one or more variations of the present system, which would similar be to the ones disclosed in the present application and are within the spirit of the invention.

What is claimed is:

1. Method of forming a bio-compatible impermeable membrane comprising the steps of:
   providing a composition consisting essentially of (i) water, (ii) a water-soluble anionic bio-degradable polymer obtained from bacteria, and (iii) platelet nanoparticles,
   wherein the water-soluble anionic bio-degradable polymer is in an amount of 1.5-10 wt %,
   wherein platelet nanoparticles are in an amount of 0.01-5 wt %, based on a total weight of the composition,
   wherein an amount (wt %) of water-soluble anionic bio-degradable polymer is larger than an amount of platelet nanoparticles,
   wherein an amount of platelet nanoparticles and water-soluble anionic bio-degradable polymer is 1.51-10 wt. %,
   applying the composition onto a surface under ambient conditions, the surface providing polyvalent cations, and
   reacting the water-soluble anionic bio-degradable polymer and polyvalent cations, thereby forming the bio-compatible impermeable membrane on the surface.

2. The method according to claim 1, wherein the surface is pre-treated and/or pre-shaped.

3. The method according to claim 1, wherein the surface is one or more of concrete, cement material, or brick.

4. The method according to claim 1, wherein the composition is applied at least once by one or more of spraying, brushing, nebulizing, or pouring, and wherein the composition is applied directly after casting cement or concrete.

5. A method of protecting a surface from degradation by performing a method according to claim 1, such as wherein the surface is protected from one or more of drying, oxidizing, corroding, wearing, fouling, or dehydrating.

6. A flexible coating comprising polyvalent cations, water, and a water soluble anionic bio-degradable polymer, obtained by a method according to claim 1.

7. One or more of concrete, cement material, or brick, comprising a water impermeable flexible polymer coating according to claim 6.

8. An aqueous composition for forming a bio-compatible impermeable membrane on a surface wherein the surface is one or more of concrete, cement material, or brick, consisting essentially of:
   (i) as a balance water,
   (ii) a water-soluble anionic bio-degradable polymer obtained from bacteria, wherein the water-soluble anionic bio-degradable polymer when in contact with polyvalent cations under ambient conditions forms a gel, the water-soluble anionic bio-degradable polymer being dissolved in the water, and
   (iii) platelet nanoparticles, the platelet nanoparticles being suspended in the water,
   wherein the water-soluble anionic bio-degradable polymer is in an amount of 1.5-10 wt %,
   wherein the platelet nanoparticles are present in an amount of 0.01-5 wt %, based on a total weight of the composition,
   wherein an amount (wt %) of water-soluble anionic bio-degradable polymer is larger than an amount of platelet nanoparticles,
   wherein an amount of platelet nanoparticles and water-soluble anionic bio-degradable polymer is 1.51-10 wt. %,
   wherein the water-soluble anionic bio-degradable polymer is selected from anionic polysaccharides or acidic biopolymers,
   wherein the polyvalent cation is one or more of calcium, iron, copper, strontium, cobalt, aluminium, zinc, magnesium, or nickel, and
   wherein the platelet nanoparticles are one or more of a natural or artificial clay, or a silicate mineral.

9. The composition according to claim 8, wherein the platelet nanoparticles are present in an amount of 0.1-5 wt %.

* * * * *